US010358576B2

(12) United States Patent
Schaefer et al.

(10) Patent No.: US 10,358,576 B2
(45) Date of Patent: Jul. 23, 2019

(54) TWO-COMPONENT COATING COMPOUNDS

(71) Applicant: BASF SE, Ludwigshafen (DE)

(72) Inventors: Harald Schaefer, Mannheim (DE); Horst Binder, Lampertheim (DE); Frederic Lucas, Mannheim (DE); Sebastian Emmerling, Rohrbach (DE)

(73) Assignee: BASF SE, Ludwigschafen (DE)

( * ) Notice: Subject to any disclaimer, the term of this patent is extended or adjusted under 35 U.S.C. 154(b) by 0 days.

(21) Appl. No.: 15/567,827

(22) PCT Filed: Apr. 12, 2016

(86) PCT No.: PCT/EP2016/058002
§ 371 (c)(1),
(2) Date: Oct. 19, 2017

(87) PCT Pub. No.: WO2016/169810
PCT Pub. Date: Oct. 27, 2016

(65) Prior Publication Data
US 2018/0086938 A1 Mar. 29, 2018

(30) Foreign Application Priority Data

Apr. 20, 2015 (EP) ..................................... 15164273

(51) Int. Cl.
| | | |
|---|---|---|
| C09D 175/06 | (2006.01) | |
| B05D 1/28 | (2006.01) | |
| B05D 3/02 | (2006.01) | |
| C08G 18/10 | (2006.01) | |
| C08G 18/24 | (2006.01) | |
| C08G 18/62 | (2006.01) | |
| C08G 18/73 | (2006.01) | |
| C08G 18/79 | (2006.01) | |
| C08G 18/02 | (2006.01) | |
| C09D 175/04 | (2006.01) | |

(52) U.S. Cl.
CPC ............ *C09D 175/06* (2013.01); *B05D 1/28* (2013.01); *B05D 3/0254* (2013.01); *C08G 18/022* (2013.01); *C08G 18/10* (2013.01); *C08G 18/242* (2013.01); *C08G 18/6229* (2013.01); *C08G 18/6254* (2013.01); *C08G 18/73* (2013.01); *C08G 18/792* (2013.01); *C09D 175/04* (2013.01)

(58) Field of Classification Search
CPC ...... C09D 175/06; C09D 175/04; B05D 1/28; B05D 3/0254; C08G 18/10; C08G 18/242; C08G 18/6254; C08G 18/73; C08G 18/6229; C08G 18/792; C08G 18/022
See application file for complete search history.

(56) References Cited

U.S. PATENT DOCUMENTS

| | | | |
|---|---|---|---|
| 4,596,678 A | 6/1986 | Merger et al. | |
| 4,596,679 A | 6/1986 | Hellbach et al. | |
| 5,087,739 A | 2/1992 | Bohmholdt et al. | |
| 2012/0029144 A1 | 2/2012 | Elizalde et al. | |
| 2013/0338330 A1* | 12/2013 | Nakagawa | C07C 263/10 528/65 |

FOREIGN PATENT DOCUMENTS

| | | |
|---|---|---|
| DE | 100 13 186 A1 | 9/2001 |
| DE | 100 13 187 A1 | 10/2001 |
| EP | 0 126 299 A1 | 11/1984 |
| EP | 0 126 300 A1 | 11/1984 |
| EP | 0 355 443 A2 | 2/1990 |
| EP | 2 543 736 A1 | 1/2013 |
| EP | 2 684 867 A1 | 1/2014 |
| EP | 2 806 026 A1 | 11/2014 |
| JP | 2011-201863 A | 10/2011 |
| JP | 5225813 B2 | 7/2013 |
| JP | 5254121 B2 | 8/2013 |
| WO | 2005/087828 A1 | 9/2005 |
| WO | 2007/113127 A1 | 10/2007 |
| WO | 2008/015134 A1 | 2/2008 |
| WO | 2008/068198 A1 | 6/2008 |
| WO | 2009/092793 A2 | 7/2009 |
| WO | 2011/073278 A1 | 6/2011 |
| WO | 2012/007431 A1 | 1/2012 |
| WO | 2012/013681 A1 | 2/2012 |

OTHER PUBLICATIONS

Douglas A. Wicks, et al., "Blocked isocyanates III: Part A. Mechanisms and chemistry", Progress in Organic Coatings, vol. 36, Issue 3, 1999, pp. 148-172, 1999.
Douglas A. Wicks, et al., "Blocked isocyanates III: Part B: Uses and applications of blocked isocyanates", Progress in Organic Coatings, vol. 41, Issues 1-3, 2001, pp. 1-83, 2001.
Douglas A. Wicks, et al., "Multistep chemistry in thin films; the challenges of blocked isocyanates", Progress in Organic Coatings, vol. 43, Issues 1-3, 2001, pp. 131-140, 2001.
International Search Report dated Jun. 8, 2016 in PCT/EP2016/058002 filed Apr. 12, 2016.

* cited by examiner

*Primary Examiner* — Robert S Walters, Jr.
(74) *Attorney, Agent, or Firm* — Oblon, McClelland, Maier & Neustadt, L.L.P.

(57) ABSTRACT

The present invention relates to the use of two-component coating compositions comprising isocyanurates of pentamethylene diisocyanate and NCO group reactive compounds with rapid curing and good chemical resistance at temperatures to 80° C.

15 Claims, No Drawings

TWO-COMPONENT COATING COMPOUNDS

The present invention relates to the use of a two-component coating composition which comprises
- a) at least one polyisocyanate obtainable by reacting pentamethylene diisocyanate
- b) at least one hydroxy-functional poly(meth)acrylate polyol
- c) at least one Lewis base as urethanization catalyst
- d) at least one organic solvent
- e) optionally other typical coatings additives
and
- f) optionally fillers, dyes and/or pigments for producing coatings in a temperature range up to 80° C.

WO 2008015134 describes a process for preparing pentamethylene 1,5-diisocyanate (PDI) that comprises converting lysine into 1,5-pentanediamine and the diamine into pentamethylene 1,5-diisocyanate. Also described is the use of PDI for producing polyisocyanates.

The patent specification further describes a suitability for the preparation of polyisocyanates containing isocyanurate, uretdione, biuret, urethane, allophanate, oxadiazinetrione, iminooxadiazinedione and/or uretonimine groups. Polyisocyanate mixtures of these kinds are used in particular for producing light-stable polyurethane coating materials and coatings. They can be used, for example, in coating materials for 1 K or 2K [1-component or 2-component] polyurethane paints, as for example for priming coats, surfacers, basecoats, unpigmented and pigmented topcoats and clearcoats in the sectors of industrial coating, especially aircraft coating or large-vehicle finishing, wood coating, automotive finishing, especially OEM or refinish, or decorative coating.

EP 2543736 describes a method for preparing pentamethylene-1,5-diamine where a microorganism that expresses lysine decarboxylase is subjected to a treatment. Also claimed is the conversion of the pentamethylene-1,5-diamine to pentamethylene 1,5-diisocyanate by phosgenation, or by carbamatization with subsequent thermal decomposition of the carbamate, involving the use of an antioxidant and an acid or sulfonamide. A description is also given of how pentamethylene 1,5-diisocyanate prepared accordingly is suited to the production of polyisocyanates comprising isocyanurate, allophanate, biuret, urethane and/or urea groups, and also of the reaction thereof with compounds comprising active hydrogen groups to give polyurethanes.

Example 24 describes the preparation of the isocyanurate of PDI from 500 parts of inventive PDI, 0.25 part of BHT (2,6-di(tert-butyl)-4-methylphenol), and 0.25 part of tris (tridecyl) phosphite at a temperature of 60° C. As a trimerization catalyst, 0.1 part of N-(2-hydroxypropyl)-N,N,N-trimethylammonium 2-ethylhexanoate was added. After 1 hour, 0.12 part of o-toluenesulfonamide was added as a catalyst stopper, and residual PDI was removed by distillation. The product was admixed with 0.02 part of o-toluenesulfonamide. The viscosity of the product was 1530 mPa*s/25° C. and its color number was 20 Hz. After a 4-day storage test at 60° C., the viscosity measured was 1650 mPa*s/25° C. and the color number 30 Hz. From the PDI oligomers, polyurethanes can be prepared. One polyisocyanurate was reacted with a polyacrylate polyol (Takelac® UA-702) and cured at 80° C. for 30 minutes, at 110° C. for 1 hour, and finally at RT for 7 days, after which determinations were made of the Martens hardness, tensile resistance, solvent resistance, and scratch resistance.

There are no data relating to curing at lower temperatures.

EP 2684867 describes pentamethylene diisocyanate obtained by phosgenation of pentamethylenediamine or its salt, prepared by a biochemical method, where the PDI comprises 5 to 400 ppm of a monochloro-substituted 1-azacyclo-2- or 3-hexene-N-carbonyl chloride. The specification also describes polyisocyanates prepared from this PDI and comprising isocyanurate, allophanate, biuret, urethane and/or urea groups, and also polyurethanes prepared therefrom by reaction with hydrogen-active compounds. Pentamethylenediamine, for example, is prepared by biochemical methods such as decarboxylation of lysine or fermentation, for example, of glucose.

In the production of PDIs of the invention, liberation from hydrolyzable chlorine and above heterocycles is accomplished by heating and distillation of PDI at 180-240° C. This is done preferably in the presence of a phosphorus-containing substance, phosphites, especially tris(tridecyl) phosphite. According to EP 2684867, a PDI of the invention has a higher reactivity in the preparation of polyisocyanates, a better shelf life for the polyisocyanates in relation to NCO degradation at 60° C., and enhanced coating qualities after reaction with hydrogen-active compounds. In the examples, a PDI isocyanurate is prepared in each case on the basis of a PDI which has been stored for 14 days prior to the reaction, at 50° C. with 50 ppm of BHT. Example 7, in analogy to EP 2543736, describes how the PDI is pre-urethanized at 80° C. for 2 hours with isobutyl alcohol in the presence of the antioxidants BHT and tris(tridecyl) phosphite, this intermediate then being isocyanuratized with 200 ppm of N-(2-hydroxypropyl)-N,N,N-trimethylammonium 2-ethylhexanoate as catalyst for 50 minutes, the catalyst then being stopped with ortho-toluenesulfonamide and the product distilled to remove excess PDI.

EP 2684867 describes how polyisocyanates based on PDI can be reacted with H-active compounds, examples being polyetherols, polyester polyols, polycarbonate polyols, polyurethane polyols, and polyacrylate polyols. It describes the reaction of acrylate polyols, examples being OLESTER Q666 and/or castor oil-based Takelac® U-27, to give polyurethane coating materials, which are cured at 80° C. for 30 minutes, at 110° C. for 1 hour, and finally at RT for 7 days, after which determinations were carried out of the Martens hardness, tensile resistance, solvent resistance, and scratch resistance.

There are no indications of the properties of a coating material when the two components are reacted at a low temperature.

EP 2806026 describes a very specific mutated lysine decarboxylase, a method in which it is used to convert L-lysine to 1,5-pentamethylenediamine, and a method using it or its salt to prepare pentamethylene 1,5-diisocyanate and, respectively from the diisocyanate, polyisocyanates comprising isocyanurate, allophanate, biuret, urethane and/or urea groups.

EP 2806026 cites the possibility of reacting a PDI-based polyisocyanate with components containing active hydrogen, examples being polyetherols, polyester polyols, polycarbonate polyols, polyurethane polyols, and polyacrylate polyols. These could be cured at room temperature to 250° C. A polyisocyanurate is prepared in analogy to EP 2543736 in the form of a pre-urethanization with 100 parts of PDI and 0.8 part of 1,3-butanediol in the presence of antioxidants, 250 ppm of BHT and 250 ppm of tris(tridecyl) phosphite, at 80° C. for 3 hours, followed by an isocyanuratization in the presence of 200 ppm of N-(2-hydroxypropyl)-N,N,N-trimethylammonium 2-ethylhexanoate as catalyst for 1 hour. The catalyst is stopped using ortho-toluenesulfonamide, excess PDI is removed by distillation, and then the product is stabilized with further ortho-toluenesulfonamide.

JP 5254121 B2 describes the preparation of a polyisocyanurate based on pentamethylene diisocyanate wherein the monomer has a hydrolyzable chlorine fraction of below 100 ppm and an oxygen fraction of less than 5 ppm. For the purpose of reducing the hydrolyzable chlorine, the PDI is heated at 160-200° C. for preferably 3-6 hours under inert gas before the trimerization, and is then rectified. The distillate fraction of 10-80% of the PDI is preferred [022]. It is also possible, for example, for hydrolyzable chlorine to be removed by treatment with metals, copper for example, before the heating step. The PDI is subjected to a degassing operation prior to the trimerization.

Examples of isocyanuratization catalysts are tetraalkylammonium hydroxides or carboxylates, as for example trimethyl-2-hydroxypropylammonium 2-ethylhexanoate (DABCO TMR). The pre-urethanization of the PDI and subsequent isocyanuratization takes place in analogy to aforementioned patents EP 2543736, EP 2684867, and EP 2806026. An advantage stated for these polyisocyanurates based on the correspondingly purified PDI is their high storage stability in relation to color number and viscosity on storage, and shorter reaction times/cost-effectiveness in the isocyanuratization.

The reaction of the polyisocyanurate based on PDI with polyols to give polyurethanes, varnishes for example, is stated.

There are no specific examples of coatings, and no comparison in application with polyisocyanurates of other diisocyanates.

JP 2011201863 A2 describes the preparation of pentamethylene diisocyanate from pentamethylenediamine or its salt on the basis of less than 2 mass % of six-membered-ring compounds with C—N double bonding.

For example, in analogy to example 24 of EP 2543736, an isocyanurate with a viscosity of 1530 mPa*s/25° C. is prepared, and analogously it is also reacted with the polyacrylate polyol Takelac® UA-702 and cured at 80° C. for 30 minutes, at 110° C. for 1 hour, and finally at RT for 7 days, after which determinations are made of the Martens hardness, tensile resistance, solvent resistance, and scratch resistance. These qualities are better than those of the isocyanurates based on the reference PDI.

There are no specific examples of suitability for coatings at lower curing temperatures, and no comparison in application with polyisocyanurates of other diisocyanates.

JP5225813 B2 describes the preparation of a polyisocyanurate based on pentamethylene diisocyanate where the monomer, in analogy to JP 5254121 B2, has a hydrolyzable chlorine fraction of below 100 ppm, with additionally the presence of a C1-C20 alcohol during the isocyanuratization and the presence of 10-5000 ppm of sulfonamide in the end product.

The PDI is prepared, for example, by a liquid phosgenation process in ortho-dichlorobenzene as solvent, with heating and multiple distillation of the PDI in order to reduce the residual HDI content below 100 ppm.

In analogy to example 24 of EP 2543736, a polyisocyanate is prepared from PDI and 1% of isobutyl alcohol, with a viscosity of 410 mPa*s. In a comparative example, in an analogy based on hexamethylene diisocyanate, a polyisocyanate is prepared with a viscosity of 600 mPa*s. In analogy to EP 2543736, the polyisocyanates are reacted with the polyacrylate polyol Takelac® UA-702 and cured at 80° C. for 30 minutes, 110° C. for 1 hour, and finally at RT for 7 days, after which determinations are made of the Martens hardness, tensile resistance, solvent resistance, and scratch resistance. These qualities are better than those of the isocyanurates based on the reference PDI.

Analogously, the polyisocyanate and the reference polyisocyanate are reacted with a polyester polyol Takelac® U-27, in analogy to polyacrylate polyol, to give a coating material. In terms of coatings properties, the PDI-based polyisocyanate scores better than that based on hexamethylene diisocyanate.

There are no examples of suitability for coatings at lower curing temperatures.

It was an object of the present invention to provide two-component coating compositions which relative to their known counterparts exhibit rapid drying and development of pendulum hardness in the temperature range to 80° C., and good chemical resistance.

The object has been achieved through the use of a two-component coating composition which comprises
  a) at least one polyisocyanate obtainable by reacting at least one pentamethylene diisocyanate,
  b) at least one hydroxy-functional poly(meth)acrylate polyol,
  c) at least one Lewis base as urethanization catalyst,
  d) at least one organic solvent,
  e) optionally other typical coatings additives and
  f) optionally fillers, dyes and/or pigments
for producing coatings in a temperature range to 80° C.

Two-component polyurethane coating compositions consist of two components, of which one comprises at least one polyisocyanate, while the second comprises at least one hydroxy-functional polymer. According to this invention, the system in question comprises at least one poly(meth)acrylate polyol and optionally a polyester polyol. Polyisocyanates here encompass oligo- and polyisocyanates.

The term "(meth)acrylic" and similar designations are an abbreviated form of "acrylic or methacrylic".

The systems here are preferably solventborne systems. Solventborne systems are understood here to be systems which in the mixture of the two components comprise organic solvents, in other words are not 100% systems and are not powder coatings (systems solid at room temperature), and which are not waterborne systems. Waterborne systems are those in which primarily water is employed as relevant solvent. Solventborne systems may include small amounts of water, as for example those introduced by the polyester as an inevitable part of the process. These amounts, based on the polyester in as-supplied form, are preferably less than 2 wt %, more preferably less than 1.0 wt %, depending on the polyester and on its preparation, more particularly below 0.5 wt %.

Unless otherwise indicated, physical measurements are made as described in the examples.

Component a) used is at least one, one to two for example, and preferably precisely one polyisocyanate which is obtainable by reaction of at least one pentamethylene diisocyanate.

Besides pentamethylene diisocyanate, monomeric isocyanates other than pentamethylene diisocyanate may be reacted. The monomeric isocyanates used may be aromatic, aliphatic or cycloaliphatic, preferably aliphatic or cycloaliphatic, which is referred to for short in this text as (cyclo)aliphatic. Aromatic isocyanates are those which comprise at least one aromatic ring system, i.e. both purely aromatic and araliphatic compounds. Cycloaliphatic isocyanates are those which comprise at least one cycloaliphatic ring system. Aliphatic isocyanates are those which comprise exclusively linear or branched chains, in other words acyclic compounds.

The monomeric isocyanates are preferably diisocyanates, bearing exactly two isocyanate groups.

They can, however, in principle also be monoisocyanates, having one isocyanate group.

In principle, higher isocyanates having an average of more than 2 isocyanate groups are also an option. Suitable examples of these include triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenating corresponding aniline/formaldehyde condensates and constitute polyphenyl polyisocyanates having methylene bridges. These monomeric isocyanates do not contain any substantial products of reaction of the isocyanate groups with themselves.

The monomeric isocyanates are preferably isocyanates having 4 to 20 C atoms. Examples of typical diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, (e.g., methyl or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)-methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, and also 3 (or 4), 8 (or 9)-bis(isocyanatomethyl)tricyclo[5.2.1.0$^{2,6}$]decane isomer mixtures, and also aromatic diisocyanates such as 2,4- or 2,6-tolylene diisocyanate and their isomer mixtures, m- or p-xylylene diisocyanate, 2,4'- or 4,4'-diisocyanatodiphenylmethane and their isomer mixtures, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene, or diphenyl ether 4,4'-diisocyanate. Particular preference is given to 1,6-hexamethylene diisocyanate, 1,3-bis(isocyanatomethyl)cyclohexane, isophorone diisocyanate, and 4,4'- or 2,4'-di(isocyanatocyclohexyl)methane, very particular preference to isophorone diisocyanate and 1,6-hexamethylene diisocyanate, and especial preference to 1,6-hexamethylene diisocyanate. It is also possible for mixtures of the isocyanates mentioned to be present.

Isophorone diisocyanate is usually in the form of a mixture, specifically a mixture of the cis and trans isomers, generally in a proportion of about 60:40 to 80:20 (w/w), preferably in a proportion of about 70:30 to 75:25, and more preferably in a proportion of approximately 75:25. Dicyclohexylmethane 4,4'-diisocyanate may likewise be in the form of a mixture of the different cis and trans isomers.

For the present invention it is possible to use not only those diisocyanates which are obtained by phosgenating the corresponding amines but also those which are prepared without the use of phosgene, i.e. by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo) aliphatic diisocyanates such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage to the corresponding diisocyanates and alcohols. The synthesis is usually effected continuously in a circulation process and optionally in the presence of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention the isocyanates used have a total hydrolyzable chlorine content of less than 80 ppm, preferably less than 30 ppm, and especially less than 25 ppm. This can be measured by means, for example, of ASTM specification D4663-98.

It is of course also possible to use mixtures of those monomeric isocyanates which have been obtained by reaction of the (cyclo)aliphatic diamines with, for example, urea and alcohols and cleavage of the resultant (cyclo)aliphatic biscarbamic esters, with those diisocyanates which have been obtained by phosgenation of the corresponding amines.

Component a) is preferably preparable without using monomeric isocyanates other than pentamethylene diisocyanate.

As an optional further component in accordance with the present invention, at least one, one to two for example, and preferably precisely one polyisocyanate is used that is obtainable by reaction exclusively of monomeric isocyanates other than pentamethylene diisocyanate.

The polyisocyanates, which can be formed by oligomerizing the monomeric isocyanates, are generally characterized as follows: The average NCO functionality of such compounds is generally at least 1.8 and may be up to 8, preferably 2 to 5, and more preferably 2.4 to 4. The content of isocyanate groups after oligomerization, calculated as NCO=42 g/mol, is generally from 5% to 28% by weight, unless indicated otherwise.

The polyisocyanates a) are the following compounds, preferably, or mixtures of them:

1) Polyisocyanates which have isocyanurate groups and derive from pentamethylene diisocyanate and/or from aromatic, aliphatic and/or cycloaliphatic diisocyanates and pentamethylene diisocyanate (PDI). Particular preference here is given to the corresponding PDI-based polyisocyanates containing isocyanurate groups. These present isocyanurates are, in particular, trisisocyanatoalkyl and/or trisisocyanatocycloalkyl isocyanurates, which are cyclic trimers of the diisocyanates, or are mixtures with their higher homologs containing more than one isocyanurate ring. The isocyanatoisocyanurates generally have an NCO content of 10% to 30% by weight, in particular 15% to 28% by weight, and an average NCO functionality of 2.6 to 8.

2) Polyisocyanates having uretdione groups and derived from pentamethylene diisocyanate. Uretdione diisocyanates are cyclic dimerization products of diisocyanates. The polyisocyanates having uretdione groups are obtained in the context of this invention in a mixture with other polyisocyanates, especially those mentioned under 1). To this end, the diisocyanates can be converted under reaction conditions under which both uretdione groups and the other polyisocyanates are formed, or the uretdione groups are formed first and these are subsequently converted to the other polyisocyanates, or the diisocyanates are first converted to the other polyisocyanates and these are then converted to products containing uretdione groups.
3) Biuret group-containing polyisocyanates of pentamethylene diisocyanate, especially tris(6-isocyanatopentyl)biuret or mixtures thereof with higher homologs thereof. These polyisocyanates having biuret groups preferably have an NCO content of 18% to 27% by weight and an average NCO functionality of 2.8 to 6.
4) Urethane and/or allophanate group-containing polyisocyanates having aromatically, aliphatically or cycloaliphatically bonded, preferably aliphatically or cycloaliphatically bonded, isocyanate groups, as are prepared, for example, by reaction of excess amounts of diisocyanate, preferably pentamethylene diisocyanate, with mono- or polyhydric alcohols. These polyisocyanates having urethane and/or allophanate groups generally have an NCO content of 12% to 26% by weight and an average NCO functionality of 2.3 to 4.5. Polyisocyanates of this kind containing urethane and/or allophanate groups are prepared, preferably, in the presence of catalysts, such as ammonium carboxylates or ammonium hydroxides, for example, in each case in the presence of monohydric, dihydric or polyhydric, preferably monohydric, alcohols.
5) Polyisocyanates comprising oxadiazinetrione groups, derived preferably from pentamethylene diisocyanate. Such polyisocyanates comprising oxadiazinetrione groups are obtainable from diisocyanate and carbon dioxide.
6) Polyisocyanates comprising iminooxadiazinedione groups, derived preferably from pentamethylene diisocyanate. Such polyisocyanates comprising iminooxadiazinedione groups are preparable from diisocyanates by means of specific catalysts. They are typically present in a mixture with polyisocyanates 1), optionally also with 2) and/or 4).
7) Uretonimine-modified polyisocyanates.
8) Carbodiimide-modified polyisocyanates.
9) Hyperbranched polyisocyanates, as known for example from DE-A1 10013186 or DE-A1 10013187.
10) Polyurethane-polyisocyanate prepolymers, from di- and/or polyisocyanates with alcohols.
11) Polyurea-polyisocyanate prepolymers.
12) The polyisocyanates 1)-11), preferably 1), 3), 4) and 6), after preparation thereof, can be converted to biuret group-containing or urethane/allophanate group-containing polyisocyanates. Biuret groups are formed, for example, by addition of water or reaction with amines. Urethane and/or allophanate groups are formed by reaction with monohydric, dihydric or polyhydric, preferably monohydric, alcohols, optionally in the presence of suitable catalysts. These biuret or urethane/allophanate group-containing polyisocyanates generally have an NCO content of 18% to 23% by weight and an average NCO functionality of 2.8 to 6.

In a preferred embodiment of the present invention, the polyisocyanate a) is selected from the group consisting of isocyanurates, iminooxadiazinediones, biurets, uretdiones, urethanes and allophanates, preferably from the group consisting of isocyanurates, urethanes and allophanates, more preferably from the group consisting of isocyanurates and allophanates, and it is especially a polyisocyanate containing isocyanurate groups.

The diisocyanates or polyisocyanates listed above may also be at least partly in blocked form. Classes of compound used for blocking are described in D. A. Wicks, Z. W. Wicks, Progress in Organic Coatings, 36, 148-172 (1999), 41, 1-83 (2001) and 43, 131-140 (2001). Examples of classes of compound used for blocking are phenols, imidazoles, triazoles, pyrazoles, oximes, N-hydroxy imides, hydroxybenzoic esters, secondary amines, lactams, CH-acidic cyclic ketones, malonic esters or alkyl acetoacetates.

In a further embodiment, the polyisocyanate a) has a viscosity of 200-1600 mPa*s (23° C.). The polyisocyanate a) preferably comprises a mixture of low-viscosity polyisocyanates, preferably polyisocyanates comprising isocyanurate groups, having a viscosity of 600-1500 mPa*s, more particularly below 1200 mPa*s, and low-viscosity allophanates and/or urethanes mixed with isocyanurate, with a viscosity of 200-1600 mPa*s.

The process for preparing the polyisocyanates may take place as described in WO 2005/087828 or WO 2008/068198, especially from page 20 line 21 to page 27 line 15 therein, which is hereby made part of the present specification by reference. The reaction can be discontinued, for example, as described therein from page 31 line 19 to page 31 line 31, and working up may take place as described therein from page 31 line 33 to page 32 line 40, which in each case is hereby part of the present specification by reference. The reaction can alternatively be discontinued as described in WO 2005/087828 from page 11 line 12 to page 12 line 5, which is hereby part of the present specification by reference. In the case of thermally labile catalysts it is also possible, furthermore, to discontinue the reaction by heating the reaction mixture to a temperature above at least 80° C., preferably at least 100° C., more preferably at least 120° C. Generally it is sufficient for this purpose to heat the reaction mixture, in the way which is necessary at the working-up stage in order to separate the unreacted isocyanate, by distillation. In the case both of thermally non-labile catalysts and of thermally labile catalysts, the possibility exists of terminating the reaction at relatively low temperatures by addition of deactivators. Examples of suitable deactivators are hydrogen chloride, phosphoric acid, organic phosphates, such as dibutyl phosphate or diethylhexyl phosphate, carbamates such as hydroxyalkyl carbamate, sulfonamides or organic carboxylic acids. These compounds are added neat or diluted in a suitable concentration as necessary to discontinue the reaction. Preference is given to dibutyl phosphate or diethylhexyl phosphate.

Low-viscosity polyisocyanates or allophanates of diisocyanates can be prepared also, for example, in accordance with WO 2005/087828. In the case of the low-viscosity polyisocyanates, the reaction is discontinued at a lower conversion than in the specific examples of WO 2005/087828, thermally or by means of chemical deactivators, but otherwise the procedure is analogous. In this way it is possible to prepare products based on a diisocyanate, having viscosities, for example, of 900-1500 mPa*s, but also with lower viscosities, preferably of up to 500 mPa*s. Allophanates as well may be prepared analogously using the same catalysts, by additionally admixing the diisocyanate monomer with monoalcohols and/or dialcohols, preferably C1-C18 monoalcohols and/or C2-C18 dialcohols. These are preferably butanol, pentanol, 2-ethylhexanol, 1,3-hexanediol, and 3,3,5-trimethyl-pentanediol. Monoalcohols are added preferably in amounts of up to 25% at maximum, relative to end product. The viscosities of the products of penta- and/or hexamethylene diisocyanate and monoalcohol are preferably in a range of 200-1500 mPa*s. Corresponding to the customary composition of the polyisocyanates 2), they contain substantial amounts of isocyanurates, and optionally of urethanes as well. High-viscosity polyisocyanates or allophanates of diisocyanates can also be prepared analogously, in accordance for example with WO 2005/087828. In the case of the high-viscosity polyisocyanates, the reaction is discontinued at a higher conversion than in the specific examples of WO 2005/087828, thermally or by means of chemical deactivators. The viscosities of polyisocyanates based on penta- or hexamethylene diisocyanate are preferably not more than 30 Pa*s. Diluting the high-viscosity compounds in solvents is sensible.

Pentamethylene diisocyanate can be prepared from pentamethylenediamine (cadaverine, diaminopentane). Pentamethylenediamine may come from a biogenic or nonbiogenic source. In the case of its preparation from a biogenic source, the pentamethylenediamine may be prepared, for example, on the basis of lysine by decarboxylation, as for example in accordance with WO 2007 113127 (page 4; line 30—page 11, line 6), or WO 2011 073278 (page 8, line 9—page 25 line 16), or by fermentation and extraction of sugars or molasses, in accordance for example with WO 2009 092793 (page 3, line 20—page 5, line 4; page 16, line 34—page 19, line 18).

Component b) comprises at least one, one to four for example, preferably one to three, more preferably one to two, and very preferably precisely one poly(meth)acrylate polyol comprising hydroxyl groups. These compounds are usually copolymers of essentially (meth)acrylic esters, examples being $C_1$-$C_{20}$ alkyl (meth)acrylates, with hydroxyalkyl (meth)acrylates, examples being the mono(meth)acrylic esters of 1,2-propanediol, ethylene glycol, 1,3-propanediol, 1,4-butanediol or 1,6-hexanediol, and also of styrene.

They preferably have a molecular weight $M_n$ (number average), as determinable by gel permeation chromatography, of 500 to 50 000 D, more particularly 500 to 10 000 D or 500 to 5000 D. In one preferred embodiment they have a molecular weight $M_n$ of 800-2000 D. The latter polyols are, in particular, poly(meth)acrylate polyols of the kind used for coating materials with low solids contents. Preferred components b) have OH numbers, measured according to DIN 53240-2:2007-11, of 15-250 mg KOH/g resin solids, preferably 60-180 mg KOH/g, more preferably 80-160 mg KOH/g. The components b) may additionally have an acid number to BS EN ISO 3682/BS 6782-3 of less than 100 mg KOH/g, preferably less than 30, and more preferably less than 20 mg KOH/g.

In the copolymerization the hydroxyl-containing monomers are used in amounts such as to result in, for the polymers, the abovementioned hydroxyl numbers, which correspond generally to a hydroxyl group content in the polymers of 0.5% to 8%, preferably 1% to 5% by weight. In general the hydroxy-functional comonomers are used in amounts of 3% to 75%, preferably 6% to 47% by weight, based on the total weight of the monomers employed. In addition it must of course be ensured that, within the context of the details given, the amount of the hydroxy-functional monomers is selected such as to form copolymers which contain on average per molecule at least two hydroxyl groups.

Examples of monomers include $C_1$-$C_{20}$ alkyl (meth)acrylates, vinylaromatics having up to 20 C atoms, vinyl esters of carboxylic acids containing up to 20 C atoms, ethylenically unsaturated nitriles, vinyl ethers of alcohols containing 1 to 10 C atoms, α,β-unsaturated carboxylic acids and their anhydrides, and aliphatic hydrocarbons having 2 to 8 C atoms and 1 or 2 double bonds. Preferred alkyl (meth) acrylates are those having a $C_1$-$C_{10}$ alkyl radical, such as methyl methacrylate, methyl acrylate, n-butyl acrylate, ethyl acrylate, and 2-ethylhexyl acrylate. In particular, mixtures of the alkyl (meth)acrylates are also suitable. Vinyl esters of carboxylic acids having 1 to 20 C atoms are, for example, vinyl laurate, vinyl stearate, vinyl propionate, and vinyl acetate. Examples of possible α,β-unsaturated carboxylic acids and their anhydrides include acrylic acid, methacrylic acid, fumaric acid, crotonic acid, itaconic acid, maleic acid or maleic anhydride, preferably acrylic acid.

Hydroxy-functional monomers include monoesters of α,β-unsaturated carboxylic acids such as acrylic acid and methacrylic acid (referred to for short in this specification as "(meth)acrylic acid") with diols or polyols that have preferably 2 to 20 C atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, neopentyl glycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3-, and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt, polyTHF having a molar weight between 162 and 4500, preferably 250 to 2000, poly-1,3-propanediol or polypropylene glycol having a molar weight between 134 and 2000 or polyethylene glycol having a molar weight between 238 and 2000. Preference is given to 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate, and particular preference to 2-hydroxyethyl acrylate and/or 2-hydroxyethyl methacrylate.

Examples of suitable vinylaromatic compounds include vinyltoluene, α-butylstyrene, 4-n-butylstyrene, 4-n-decylstyrene, and preferably styrene. Examples of nitriles include acrylonitrile and methacrylonitrile. Examples of suitable vinyl ethers include vinyl methyl ether, vinyl isobutyl ether, vinyl hexy ether, and vinyl octyl ether. Nonaromatic hydrocarbons having 2 to 8 C atoms and one or two olefinic double bonds include butadiene, isoprene, and also ethylene, propylene, and isobutylene. Also possible for use are N-vinylformamide, N-vinylpyrrolidone, and N-vinyl-caprolactam, and, additionally, ethylenically unsaturated acids, more particularly carboxylic acids, acid anhydrides or acid amides, and also vinylimidazole. Comonomers containing epoxide groups as well, such as glycidyl acrylate or methacrylate, for example, or monomers such as N-methoxymethylacrylamide or -methacrylamide, can be used as well in small amounts.

Preferred are esters of acrylic acid and/or methacrylic acid having 1 to 18, preferably 1 to 8, C atoms in the alcohol residue, such as methyl acrylate, ethyl acrylate, isopropyl acrylate, n-propyl acrylate, n-butyl acrylate, 2-ethylhexyl acrylate, n-stearyl acrylate, the methacrylates corresponding to these acrylates, styrene, alkyl-substituted styrenes, acrylonitrile, methacrylonitrile, vinyl acetate or vinyl stearate, and any desired mixtures of such monomers.

The monomers bearing hydroxyl groups are used, in the copolymerization of the (meth)acrylates bearing hydroxyl groups, in a mixture with other polymerizable monomers, preferably radically polymerizable monomers, preferably those which are composed to an extent of more than 50% by weight of $C_1$-$C_{20}$, preferably $C_1$-$C_4$, alkyl (meth)acrylate, (meth)acrylic acid, vinylaromatics having up to 20 C atoms, vinyl esters of carboxylic acids comprising up to 20 C atoms, vinyl halides, nonaromatic hydrocarbons having 4 to 8 C atoms and 1 or 2 double bonds, unsaturated nitriles, and mixtures thereof. Particularly preferred polymers are those which besides the monomers bearing hydroxyl groups are composed to an extent of more than 60% by weight of $C_1$-$C_{10}$ alkyl (meth)acrylates, styrene and its derivatives, or mixtures thereof.

The polymers can be prepared by polymerization, by conventional methods. Preferably the polymers are prepared in an emulsion polymerization or in organic solution. Continuous or discontinuous polymerization processes are possible. The discontinuous processes include the batch process and the feed process, the latter being preferred. With the feed process, the solvent is introduced as an initial charge, on its own or with a portion of the monomer mixture, this initial charge is heated to the polymerization temperature, the polymerization is initiated radically in the case of an initial monomer charge, and the remaining monomer mixture is metered in, together with an initiator mixture, in the course of 1 to 10 hours, preferably 3 to 6 hours. Subsequently, if desired, the batch is reactivated, in order to carry out the polymerization to a conversion of at least 99%. Examples of suitable solvents include aromatics, such as solvent naphtha, benzene, toluene, xylene, chlorobenzene, esters such as ethyl acetate, butyl acetate, methylglycol acetate, ethylglycol acetate, methoxypropyl acetate, ethers such as butylglycol, tetrahydrofuran, dioxane, ethylglycol ether, ketones such as acetone, methyl ethyl ketone, and halogenated solvents such as methylene chloride or trichloromonofluoroethane.

A further optional component used according to the present invention is at least one, one to three for example, preferably one to two, and more preferably precisely one polyester polyol. The number-average molecular weight Mn is preferably at least 500 g/mol, more preferably at least 700 g/mol. The upper limit on the molecular weight $M_n$ is preferably 30 000 g/mol, more preferably 10 000 g/mol, very preferably 4000 g/mol. One preferred embodiment has the molecular weight $M_n$ being from 500 to 4000, more particularly from 700 to 2000 g/mol. The polydispersity $M_w/M_n$ is preferably 1.1-50, more preferably less than or equal to 5, more particularly less than 3.5.

The polyester polyols are essentially reaction products of polybasic acids or derivatives thereof and polyhydric alcohols. Polybasic acids are, for example, dicarboxylic acids, tricarboxylic acids, and polycarboxylic acids. Polyhydric alcohols are, for example, diols or triols.

The dicarboxylic acids include, for example, aliphatic dicarboxylic acids, such as oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and cis- and trans-cyclopentane-1,3-dicarboxylic acid. It is also possible additionally to use aromatic dicarboxylic acids, such as phthalic acid, isophthalic acid or terephthalic acid, for example. Unsaturated dicarboxylic acids as well, such as maleic acid or fumaric acid, can be used, albeit less preferably. Hexahydrophthalic anhydride is preferred.

Said dicarboxylic acids may also be substituted by one or more radicals selected from: $C_1$-$C_{20}$ alkyl groups, examples being methyl, ethyl, n-propyl, isopropyl, n-butyl, isobutyl, sec-butyl, tert-butyl, n-pentyl, isopentyl, sec-pentyl, neopentyl, 1,2-dimethyl propyl, isoamyl, n-hexyl, isohexyl, sec-hexyl, n-heptyl, isoheptyl, n-octyl, 2-ethylhexyl, trimethylpentyl, n-nonyl, n-decyl, n-dodecyl, n-octadecyl, and n-eicosyl; $C_3$-$C_{12}$ cycloalkyl groups, such as cyclopropyl, cyclobutyl, cyclopentyl, cyclohexyl, cycloheptyl, cyclooctyl, cyclononyl, cyclodecyl, cycloundecyl and cyclododecyl, for example; preference is given to cyclopentyl, cyclohexyl and cycloheptyl; alkylene groups such as methylene or ethylidene; or $C_6$-$C_{14}$ aryl groups such as, for example, phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, more preferably phenyl.

Exemplary representatives of substituted dicarboxylic acids that may be mentioned include the following: 2-methylmalonic acid, 2-ethylmalonic acid, 2-phenylmalonic acid, 2-methylsuccinic acid, 2-octadecenylsuccinic acid and its anhydride (see below), 2-ethylsuccinic acid, 2-phenyl-succinic acid, itaconic acid, 3,3-dimethylglutaric acid. It is also possible to use mixtures of two or more of the aforementioned dicarboxylic acids.

The dicarboxylic acids can be used either as such or in the form of derivatives. Derivatives are preferably understood to mean the corresponding anhydrides in monomeric or else polymeric form, mono- or dialkyl esters, preferably mono- or di-$C_1$-$C_4$-alkyl esters, more preferably mono- or dimethyl esters or the corresponding mono- or diethyl esters, or else mono- and divinyl esters, and also mixed esters, preferably mixed esters with different $C_1$-$C_4$-alkyl components, more preferably mixed methyl ethyl esters.

For the purposes of this specification, $C_1$-$C_4$ alkyl denotes methyl, ethyl, isopropyl, n-propyl, n-butyl, isobutyl, sec-butyl and tert-butyl, preferably methyl, ethyl and n-butyl, more preferably methyl and ethyl, and very preferably methyl.

It is also possible to use a mixture of a dicarboxylic acid and one or more of its derivatives. Likewise possible within the context of the present invention is to use a mixture of two or more different derivatives of one or more dicarboxylic acids. Optional dicarboxylic acids are, in particular, malonic acid, sebacic acid, succinic acid, glutaric acid, adipic acid, 1,2-(hexahydrophthalic acid), 1,3- or 1,4-cyclohexanedicarboxylic acid, phthalic acid, isophthalic acid, terephthalic acid or the monoalkyl or dialkyl esters thereof.

Tricarboxylic acids or polycarboxylic acids are, for example, aconitic acid, 1,3,5-cyclohexanetricarboxylic acid, 1,2,4-benzenetricarboxylic acid, 1,3,5-benzenetricarboxylic acid, 1,2,4,5-benzenetetracarboxylic acid (pyromellitic acid), and also mellitic acid and low molecular mass polyacrylic acids. The index "x" here stands for the functionality in terms of carboxyl groups represented by "A"; it is governed by x≥3, preferably x=3 or 4 and more preferably x=3. In the reaction according to the invention, tricarboxylic acids or polycarboxylic acids ($A_x$) may be used either as such or else in the form of derivatives.

Derivatives are preferably understood to mean the corresponding anhydrides in monomeric or else polymeric form, mono-, di- or trialkyl esters, preferably mono-, di- or tri-$C_1$-$C_4$ alkyl esters, more preferably mono-, di- or trimethyl esters or the corresponding mono-, di- or triethyl esters, additionally mono-, di- and trivinyl esters, and also mixed esters, preferably mixed esters of different $C_1$-$C_4$ alkyl components, more preferably mixed methyl ethyl esters.

It is also possible to use a mixture of a tricarboxylic or polycarboxylic acid and one or more of its derivatives, such as a mixture of pyromellitic acid and pyromellitic dianhydride, for example. It is likewise possible within the context of the present invention to use a mixture of two or more different derivatives of one or more tricarboxylic or polycarboxylic acids, such as a mixture of 1,3,5-cyclohexanetricarboxylic acid and pyromellitic dianhydride, for example.

As diols as building blocks for the polyester polyols, use is made, for example, of ethylene glycol, propane-1,2-diol, propane-1,3-diol, 2-butyl-2-ethyl-1,3-propanediol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2- and 1,3-cyclopentanediols, 1,2-, 1,3- and 1,4-cyclohexanediols, 1,1-, 1,2-, 1,3- and 1,4-bis(hydroxymethyl)cyclohexanes, 1,1-, 1,2-, 1,3- and 1,4-bis(hydroxyethyl)cyclohexanes, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, wherein n is an integer and n≥4, polyethylene-polypropylene glycols, wherein the sequence of the ethylene oxide and of the propylene oxide units may be blockwise or random, polytetramethylene glycols, preferably up to a molecular weight of up to 5000 g/mol, poly-1,3-propanediols, preferably having a molecular weight of up to 5000 g/mol, polycaprolactones or mixtures of two or more representatives of the above compounds. Either one or both hydroxyl groups in the abovementioned diols may be substituted by SH groups. Diols used with preference are ethylene glycol, 1,2-propanediol, 1,3-propanediol, 2-butyl-2-ethyl-1,3-propanediol, 1,4-butanediol, 1,5-pentanediol, neopentyl glycol, 1,6-hexanediol, 1,8-octanediol, 1,2-, 1,3- and 1,4-cyclohexanediol, 1,3- and 1,4-bis(hydroxymethyl)cyclohexane, and also diethylene glycol, triethylene glycol, dipropylene glycol, and tripropylene glycol.

Alcohols with a functionality of at least three as building blocks of the polyester polyols encompass trimethylolpropane, glycerol, trimethylolmethane, trimethylolethane, 1,2,4-butanetriol, tris(hydroxymethyl)amine, tris(hydroxyethyl) amine, tris(hydroxypropyl)amine, pentaerythritol, diglycerol, triglycerol or higher condensates of glycerol, di(trimethylolpropane), di(pentaerythritol), trishydroxymethyl isocyanurate, tris(hydroxyethyl) isocyanurate (THEIC), tris(hydroxypropyl) isocyanurate, inositols or sugars, such as glucose, fructose or sucrose, for example, sugar alcohols such as sorbitol, mannitol, threitol, erythritol, adonitol (ribitol), arabitol (lyxitol), xylitol, dulcitol (galactitol), maltitol, isomalt, polyethers with a functionality of three or more, based on alcohols with a functionality of three or more and on ethylene oxide, propylene oxide and/or butylene oxide. Particular preference is given here to glycerol, diglycerol, triglycerol, trimethylolethane, ditrimethylolpropane, 1,2,4-butanetriol, pentaerythritol, tris(hydroxyethyl) isocyanurate and also polyethers thereof based on ethylene oxide and/or propylene oxide. Very particular preference is given to glycerol, ditrimethylolpropane and pentaerythritol. The index "y" here stands for the functionality in terms of hydroxyl groups represented by "B"; it is governed by y≥3, preferably y=3 or 4 and more preferably y=3.

The polyester polyols can be prepared in the presence or absence of catalysts.

The polyester polyols may have functionalization, but preferably have no functionalization.

The two-component polyurethane coating compositions of the invention generally have a stoichiometry of isocyanate groups in a) to isocyanate-reactive groups in b) of 0.5:1 to 2:1, preferably 0.7:1 to 1.3:1, more preferably 0.8:1 to 1.2:1, and especially 0.9:1 to 1.1:1.

The weight ratio of the poly(meth)acrylate polyol b) component to the polyester polyol component can be 1.5:1 to 99:1, preferably 2.3:1 to 20:1 and especially from 2.7:1 to 20:1, in each case based on solids.

In one preferred embodiment there is no polyester polyol present.

Employed as component c) is at least one, one to two for example and preferably precisely one, Lewis base as urethanization catalyst.

Urethanization catalysts are compounds with the capacity to accelerate the reaction of isocyanate groups with groups that are reactive toward isocyanate. Compounds with the capacity to accelerate the reaction of isocyanate groups with groups that are reactive toward isocyanate are compounds which by virtue of their presence in a reactant mixture lead to a higher fraction of reaction products containing urethane groups than does the same reactant mixture in their absence under the same reaction conditions. The Lewis base c) may preferably have a pKa of more than 8. The pKa is determined in water. In one preferred embodiment of the present invention, the Lewis base c) is an organic amine. More particularly the Lewis base c) is selected from the group consisting of tertiary aliphatic, cycloaliphatic, aromatic amines, amidines, guanidines, and ionic liquids containing amine groups.

Particularly preferred organic amines are cycloaliphatic and aliphatic amines. Aliphatic amines are, for example, triethylamine, N-methylmorpholine, N,N-dimethylcyclohexylamine, N,N'-dimethylpiperazine, N,N-dimethylethanolamine, and N,N,N',N',N''-pentamethyl-diethylene-triamine. Especially preferred organic amines are cycloaliphatic amines. These are, by way of example, triethylendiamine (TEDA, 1,4-diazabicyclo[2.2.2]octane), 1,8-diazabicyclo[5.4.0]-undecane (DBU), and 1,5-diazabicyclo[4.3.0]non-5-ene (DBN).

Ionic liquids here mean salts with a melting point of below 100° C. Their melting point is preferably below 60° C., more preferably below 23° C. Preferred ionic liquids containing amine groups are imidazolium salts of the formula

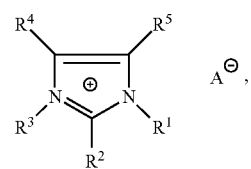

in which $R^1$ and $R^3$ independently of one another are an organic radical having 1 to 20 C atoms, $R^2$, $R^4$, and $R^5$ independently of one another are an H atom or an organic radical having up to 20 C atoms, and A⁻ is an anion. The anion A⁻ may preferably comprise carboxylate anions which are anions of aliphatic or aromatic carboxylic acids. Examples mentioned of aromatic carboxylic acids are benzoate, salicylate, and nicotinate. Preference is given to 1-ethyl-3-methylimidazolium carboxylates, especially 1-ethyl-3-methylimidazolium benzoate.

The Lewis base c) is present preferably in amounts <5%, more preferably <4%, very preferably <2%, based on polyol (solid) in the two-component coating compositions.

Additionally present is a solvent or solvent mixture d), moreover.

Solvents which can be used for the polyisocyanate component, and also for the binder component and any further components, are those which do not have any groups reactive toward isocyanate groups or blocked isocyanate groups, and in which the polyisocyanates are soluble to an extent of at least 10 wt %, preferably at least 25, more preferably at least 50, very preferably at least 75, more particularly at least 90 and especially at least 95 wt %.

Examples of solvents of this kind are aromatic (including alkylated benzenes and naphthalenes) and/or (cyclo)aliphatic hydrocarbons and mixtures thereof, chlorinated hydrocarbons, ketones, esters, alkoxylated alkyl alkanoates, ethers, and mixtures of the solvents.

Preferred aromatic hydrocarbon mixtures are those which comprise the predominantly aromatic $C_7$- to $C_{14}$ hydrocarbons and may span a boiling range from 110 to 300° C., particular preference being given to toluene, o-, m-, p-xylene, trimethylbenzene isomers, tetramethylbenzene isomers, ethylbenzene, cumene, tetrahydronaphthalene, and mixtures comprising them.

Examples of such are the Solvesso® brands from ExxonMobil Chemical, particularly Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® brands from Shell, Caromax® (e.g., Caromax® 18) from Petrochem Carless, and Hydrosol from DHC (e.g., as Hydrosol® A 170). Hydrocarbon mixtures composed of paraffins, cycloparaffins, and aromatics are also available commercially under the designations Kristalloel (for example, Kristalloel 30, boiling range about 158-198° C., or Kristalloel 60: CAS No. 64742-82-1), white spirit (for example, likewise CAS No. 64742-82-1), or Solventnaphtha (light: boiling range about 155-180° C., or heavy: boiling range about 225-300° C.). The aromatic content of such hydrocarbon mixtures is generally more than 90 wt %, preferably more than 95, more preferably more than 98, and very preferably more than 99 wt %. It may be advisable to use hydrocarbon mixtures having a particularly reduced naphthalene content.

Examples of (cyclo)aliphatic hydrocarbons are decalin, alkylated decalin, and isomer mixtures of linear or branched alkanes and/or cycloalkanes. The amount of aliphatic hydrocarbons is generally less than 5, preferably less than 2.5, and more preferably less than 1 wt %.

Examples of esters are n-butyl acetate, ethyl acetate, 1-methoxyprop-2-yl acetate, and 2-methoxyethyl acetate.

Examples of ethers are THF, dioxane, and the dimethyl, diethyl or di-n-butyl ethers of ethylene glycol, diethylene glycol, triethylene glycol, propylene glycol, dipropylene glycol, or tripropylene glycol.

Examples of ketones are acetone, diethyl ketone, ethyl methyl ketone, isobutyl methyl ketone, methyl amyl ketone, and tert-butyl methyl ketone.

Preferred solvents are n-butyl acetate, ethyl acetate, 1-methoxyprop-2-yl acetate, 2-methoxyethyl acetate, and mixtures thereof, especially with the aromatic hydrocarbon mixtures recited above, more particularly xylene and Solvesso® 100.

Preferred are butyl acetate, 1-methoxyprop-2-yl acetate, methyl amyl ketone, xylene, and Solvesso® 100.

Typical coatings additives e) used in the coating compositions may be the following, for example: UV stabilizers such as UV absorbers and suitable radical scavengers (especially HALS compounds, hindered amine light stabilizers), catalysts (activators, accelerators), drying agents, antistatic agents, flame retardants, thickeners, thixotropic agents, surface-active agents, viscosity modifiers, plasticizers or chelating agents.

Suitable UV absorbers comprise oxanilides, triazines and benzotriazole (the latter available, for example, as Tinuvin® grades from BASF SE) and benzophenones (e.g. Chimassorb® 81 from BASF SE). Preference is given, for example, to 95% benzenepropanoic acid, 3-(2H-benzo-triazol-2-yl)-5-(1,1-dimethylethyl)-4-hydroxy-, C7-9-branched and linear alkyl esters; 5% 1-methoxy-2-propyl acetate (e.g. Tinuvin® 384) and α-[3-[3-(2H-benzotriazol-2-yl)-5-(1,1-dimethyl-ethyl)-4-hydroxyphenyl]-1-oxopropyl]-ω-hydroxypoly(oxo-1,2-ethanediyl) (e.g. Tinuvin® 1130), in each case products, for example, of BASF SE. DL-alpha-tocopherol, tocopherol, cinnamic acid derivatives and cyanoacrylates can likewise be used for this purpose.

These can be employed alone or together with suitable radical scavengers, examples being sterically hindered amines (often also identified as HALS or HAS compounds; hindered amine (light) stabilizers) such as 2,2,6,6-tetramethylpiperidine, 2,6-di-tert-butylpiperidine or derivatives thereof, e.g. bis(2,2,6,6-tetramethyl-4-piperidyl) sebacate. They are obtainable, for example, as Tinuvin® products and Chimassorb® products from BASF SE. Preference in joint use with Lewis acids, however, is given to those hindered amines which are N-alkylated, examples being bis(1,2,2,6,6-pentamethyl-4-piperidinyl) [[3,5-bis(1,1-dimethylethyl)-4-hydroxyphenyl]methyl]-butylmalonate (e.g. Tinuvin® 144 from BASF SE); a mixture of bis(1,2,2,6,6-pentamethyl-4-piperidinyl)sebacate and methyl(1,2,2,6,6-pentamethyl-4-piperidinyl) sebacate (e.g. Tinuvin® 292 from BASF SE); or which are N—(O-alkylated), such as, for example, decanedioic acid, bis(2,2,6,6-tetramethyl-1-(octyloxy)-4-piperidinyl) ester, reaction products with 1,1-dimethylethyl hydroperoxide and octane (e.g., Tinuvin® 123 from BASF SE). UV stabilizers are used typically in amounts of 0.1% to 5.0% by weight, preferably 2-4% by weight based on the solid components present in the preparation.

Suitable thickeners include not only radically (co)polymerized (co)polymers but also customary organic and inorganic thickeners such as hydroxymethylcellulose or bentonite. As chelating agents it is possible, for example, to use ethylenediamineacetic acid and its salts, and also β-diketones.

As a further component f) in addition it is possible optionally for fillers, dyes and/or pigments to be present. Pigments in the true sense are, according to CD Römpp Chemie Lexikon—Version 1.0, Stuttgart/New York: Georg Thieme Verlag 1995, with reference to DIN 55943, particulate "colorants that are organic or inorganic, chromatic or achromatic and are virtually insoluble in the application medium". Virtually insoluble here means a solubility at 25° C. below 1 g/1000 g application medium, preferably below 0.5, more preferably below 0.25, very particularly preferably below 0.1, and in particular below 0.05 g/1000 g application medium. Examples of pigments in the true sense comprise any desired systems of absorption pigments and/or effect pigments, preferably absorption pigments. There are no restrictions whatsoever on the number and selection of the pigment components. They may be adapted as desired to the particular requirements, such as the desired perceived color, for example, as described in step a), for example. It is possible for example for the basis to be all the pigment components of a standardized mixer system. Effect pigments are all pigments which exhibit a platelet-shaped construction and give a surface coating specific decorative color effects. The effect pigments are, for example, all of the pigments which impart effect and can be used typically in vehicle finishing and industrial coatings. Examples of such effect pigments are pure metallic pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum; or liquid-crystal pigments, for example. The coloring absorption pigments are, for example, typical organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide and carbon black.

Dyes are likewise colorants, and differ from the pigments in their solubility in the application medium; i.e., they have a solubility at 25° C. of more than 1 g/1000 g in the application medium. Examples of dyes are azo, azine, anthraquinone, acridine, cyanine, oxazine, polymethine, thiazine and triarylmethane dyes. These dyes may find application as basic or cationic dyes, mordant dyes, direct dyes, disperse dyes, development dyes, vat dyes, metal complex dyes, reactive dyes, acid dyes, sulfur dyes, coupling dyes or substantive dyes.

Coloristically inert fillers are all substances/compounds which on the one hand are coloristically inactive, i.e., exhibit a low intrinsic absorption and have a refractive index similar to that of the coating medium, and which on the other hand are capable of influencing the orientation (parallel alignment) of the effect pigments in the surface coating, i.e., in the applied coating film, and also properties of the coating or of the coating compositions, such as hardness or rheology, for example. Inert substances/compounds which can be used are given by way of example below, but without restricting the concept of coloristically inert, topology-influencing fillers to these examples. Suitable inert fillers meeting the definition may be, for example, transparent or semitransparent fillers or pigments, such as silica gels, blancfixe, kieselguhr, talc, calcium carbonates, kaolin, barium sulfate, magnesium silicate, aluminum silicate, crystalline silicon dioxide, amorphous silica, aluminum oxide, microspheres or hollow microspheres made, for example, of glass, ceramic or polymers, with sizes of 0.1-50 μm, for example. Additionally as inert fillers it is possible to employ any desired solid inert organic particles, such as urea-formaldehyde condensates, micronized polyolefin wax and micronized amide wax, for example. The inert fillers can in each case also be used in a mixture. It is preferred, however, to use only one filler in each case. Preferred fillers comprise silicates, for example silicates obtainable by hydrolysis of silicon tetrachloride, such as Aerosil® from Degussa, siliceous earth, talc, aluminum silicates, magnesium silicates, and calcium carbonates, etc.

The coatings of the invention are produced in a temperature range to 80° C., preferably in a temperature range from 0° C. to 80° C., more preferably in a temperature range from ambient temperature to 80° C. Ambient temperature is normally considered to be the temperature in which the coated substrate is used in the manner intended for it.

Generally speaking, for the production of the coatings of the invention, the polyisocyanate a) and also the binder b) are mixed with one another in the desired molar ratio of isocyanate groups in a) to isocyanate-reactive groups in b). The catalysts c) and solvents d), and optionally further coating components e) and f), are mixed accordingly beforehand into one of the two components. Lastly, the mixture of polyisocyanate component comprising the polyisocyanate a) and of binder component comprising the binder b) is applied to the substrate and the coating mixture is cured.

The substrates are generally coated by typical methods known to the skilled person, with at least one coating composition being applied in the desired thickness to the substrate to be coated, and any volatile constituents of the coating composition being removed, if desired with heating. This operation may if desired be repeated one or more times. Application to the substrate may take place in a known way, such as for example by spraying, troweling, knifecoating, brushing, rolling, roller coating, pouring, laminating, injection-backmolding or coextruding. The thickness of a film of this kind for curing may be from 0.1 μm up to several mm, preferably from 1 to 2000 μm, more preferably 5 to 200 μm, very preferably from 5 to 60 μm (based on the coating material in the state in which the solvent has been removed from the coating material).

Following the application of the coating composition, the coating mixture is cured generally at ambient temperature to 80° C., preferably 0 to 80° C., more preferably at ambient temperature to 80° C. Especially at elevated temperature, this generally takes no longer than 2 hours, more particularly no longer than 1 hour, e.g., 10-40 minutes. Curing may also take place with and/or be assisted by infrared radiation.

Polyurethane coating materials of this kind are especially suitable for applications requiring particularly high application reliability, exterior weathering resistance, optical qualities, solvent resistance, chemical resistance and water resistance.

The two-component coating compositions and coating formulations obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated. Preference is given to wood, metals and plastics, which may optionally have been precoated or pretreated. Particularly preferred are metals and plastics.

Coating compositions of this kind are suitable as or in interior or exterior coatings, i.e., in those applications where there is exposure to daylight, coatings on (large) vehicles and aircraft, and industrial applications, railways, utility vehicles in agriculture and construction, especially known as ACE (agricultural, construction and earthmoving equipment), wind turbines, bridges, power masts, tanks, containers, pipelines, power stations, chemical plants, ships, cranes, halls, roofs, furniture, windows, doors, wood flooring, paper, board, for floor coverings, such as in parking levels or in hospitals and in particular in automotive paints as refinish. Preferred are refinish, plastics, and industrial applications, ACE for example.

In particular the coating compositions of the invention are used in coatings applications, preferably as clearcoat, basecoat, topcoat, primer or surfacer materials, especially as clearcoat or topcoat materials.

The coating compositions of the invention exhibit, in particular, rapid drying and development of pendulum hardness at temperatures to 80° C. and good chemical resistance.

Curing takes place preferably for less than 4 h, more preferably less than 2 h, very preferably less than 1 h at elevated temperature. It may also be followed by an after-cure at room temperature.

EXAMPLES

Test Methods

The determination of hydroxyl numbers for the branched polyesterols is based on DIN 53240-2:2007-11. The calculation takes account of the acid number.

The determination of acid numbers for the branched polyesters is made according to DIN EN ISO 2114:2000, Method A.

Viscosities are reported at 23° C. in accordance with DIN EN ISO 3219/A.3 in a cone/plate system with a shear rate of $1000\ s^{-1}$.

The molar masses and polydispersities are determined by gel permeation chromatography with TÜV-certified PMMA standards from PSS (Polymer Standards Service; DIN EN ISO 9001:2000, certificate: 01 100 84065.). These standards are characterized according to the requirements of DIN 55672 and ISO/EN 13885.

GPC takes place with:
Instrument: PSS Agilent Technologies 1260 Infinity
Columns: 1× PLGel Mixed E Guard (precolumn), length 5 cm, diameter 0.75 cm
1× PLGel Mixed E, length 30 cm, diameter 0.75 cm
1× PLGel Resipore, length 30 cm, diameter 0.75 cm
Solvent: THF
Flow rate: 1 ml/min
Injection volume: 50 µL
Concentration: 1 g/L
Temperature: room temperature (20° C.)

The nonvolatile fraction (NvF) was determined by the thermogravimetric principle with the aid of a Mettler Toledo HB43-S moisture analyzer. For this determination, approximately 2 g of the sample were weighed into an aluminum sample boat with a diameter of 90 mm (HA-D90) and heated at 150° C. to constant weight.

The flow time was determined on the basis of ISO 2431 and EN 535 using a DIN 4 cup, and was adjusted to around 20 seconds at RT.

For the determination of the gel time, the liquid paint directly after its preparation was introduced into a test tube (20 mm×180 mm) with a copper pad (about 5 mm×5 mm) attached adhesively at the bottom end. The fill level of the test tube was at least 60%. The test tube was placed into a slot in the gel time apparatus. Here, a contact was closed between copper pad and gel time apparatus. A metal spoke with a bent tip was clamped into the spoke holder at a length of 22 cm. The spoke holder was then inserted into the apparatus. This caused the spoke to be immersed in the liquid paint. The opening of the test tube was closed with a perforated lid. The spoke was guided through the hole in the lid. When the apparatus was started up, a counter was initiated. Furthermore, the assembly moved the spoke in the sample up and down until the sample became solid or gelled. When the test tube was subsequently lifted, the contact of the copper pad was lost, and the counter of the apparatus was halted automatically. Measurement took place at 23±2° C. and 50±10% humidity.

Technical Application

Inventive coating compositions L and noninventive coating compositions V-L were prepared.

Coating operations took place using a four-way bar coater in a dry film thickness of 35-45 µm. The wet film thicknesses were 150 µm with Joncryl® 507 in the clearcoat.

Coating films were conditioned at 23±2° C. and 50±10% humidity for the determination of the development of pendulum hardness.

Curing can also take place at temperatures higher than room temperature. For this purpose, the coatings were flashed at room temperature for 10-15 minutes. Conditioning took place in general at 60° C. or at 80° C. for 30 minutes.

Curing was followed by conditioning at 23∓2° C. and 50±10% humidity, unless explicitly stated otherwise, for 24 hours.

Dust dry time: To determine the dust dry time, the paint was applied to a glass plate at room temperature and the paint surface was contacted with a cotton pad at intervals of time. The paint is considered dust dry when cotton no longer remains sticking to the surface. Measurement took place at ambient temperature.

Sand dry time and through dry time: To test the drying behavior of the paints, a hopper fitted with wheels and filled with about 60-80 g of sand was drawn at a constant rate of advance of 1 cm/h over a freshly painted glass plate. After the end of the tests, the plate was carefully freed from loose sand using a fine brush. The sand dry time is the time between commencement of the test and the final lasting adhesion of the grains of sand. The through dry time was the time over which the wheels of the hopper still left a track in the paint. Drying takes place at 23∓2° C. and 50∓10% humidity. The measurements took place at 23∓2° C. and 50∓10% humidity.

(Isothermally) or on deep-drawn metal panels (gradient oven 80-180° C.) the pendulum hardness was determined by the method of König on glass plates (DIN EN ISO 1522).

The Erichsen cupping was determined in accordance with DIN EN ISO 1520 on a deep-drawn panel.

The cross-cut was determined in accordance with DIN EN ISO 2409 on a Bonder panel.

The gloss of the paint was determined by means of a Mikro TRI-Gloss instrument.

For the determination of the chemical resistance for automotive applications, a painted, deep-drawn metal panel (gradient oven panel) was thermally conditioned at 60° C. or 80° C. for 30 minutes and for 16-24 h at 23∓2° C. and 50∓10% humidity. This was followed by the application by an Eppendorf pipette, per heating element (30-75° C.), of drops of the following test substances: sulfuric acid (1% strength; 25 µl), sodium hydroxide solution (1% strength; 25 µl), pancreatin (50 µl), and tree resin (25 µl). In the case of the latter two agents, every other heating element was left out. The test panel was then placed into the gradient oven (from BYK Gardner) and thermally conditioned at 30-75° C. for 30 minutes. After the end of this operation, the panel was cleaned to remove the sulfuric acid and sodium hydroxide solution, using fully demineralized water. The panel was subsequently cleaned with hot water and a soft cloth to remove the adhering pancreatin. Thereafter the tree resin was cleaned, thoroughly but gently, using a soft cloth and wash benzine. Lastly, the panel was washed off thoroughly but gently using cold water, and the remaining drops of water were removed using a soft paper towel. After 24 hours of conditioning at 23∓2° C. and 50∓10% humidity, evaluation took place. A record was made of the temperature at which the first attack on the coating is perceptible under artificial light.

Source of tree resin Wörwag, tree resin solution DBL 5416 No.: 701014.

Pancreatin (from Merck, Art. 7130) is mixed with fully demineralized water 1:1% by weight in a porcelain mortar.

Materials Used

Basonat® HI 100 Isocyanurate, about 2800 mPa*s, 22.0% NCO value, product from BASF SE
Joncryl® 507: Polyacrylateol, OH number 140 mg KOH/g, acid number 7 mg KOH/g, 80% solids content in butyl acetate; BASF SE, Ludwigshafen
DABCO TMR® N-(2-hydroxypropyl)-N,N,N-trimethylammonium 2-ethylhexanoate, 75% in ethylene glycol, product of Air Products
DBTL Dibutyltin dilaurate, catalyst, Aldrich
Borchi® Kat 22 Zinc bis(2-ethylhexanoate), 100%, OMG Borchers Preparation of Pentamethylene Diisocyanate A 500 ml round-bottomed flask with gas introduction tube, stirrer, and an intensive condenser cascade composed of a –10° C. intensive condenser and a –78° C.-temperature guard condenser is charged with 51.1 g of 1,5-pentanediamine in 459.9 g of ortho-dichlorobenzene at room temperature.

Introduced into this solution at 80° C. over the course of 2 hours are 37 g of hydrogen chloride; a suspension is formed. This suspension is held at 80° C. for a further 2 hours.

Phosgene is then introduced into this suspension until a mild reflux is established (about 15 g of phosgene).

After being stirred at RT for an hour, the suspension is heated to 155° C. During this time, phosgene is introduced at the same time it is consumed, and so a gentle phosgene reflux is observed stably. In the course of the reaction, the suspension breaks down completely, and after 21 hours at 155° C., a clear, brown solution is obtained, in which 1,5-pentanediamine is no longer detectable on cooling and dephosgenation. After this, all of the volatile constituents are subjected to fractional distillation. The product is 57 g (73% of theory) of a colorless liquid, and is the desired diisocyanate.

Preparation of the Isocyanurate of Pentamethylene Diisocyanate

Example PI1

132 g of pentamethylene diisocyanate corresponding to the above synthesis (NCO content 54.3%) were reacted with 341 ppm of DABCO TMR, 7.5% strength in 2-ethylhexanol (600 mg of catalyst solution), in a three-neck flask with stirrer at 75-78° C. After 30 minutes, an NCO content of 44.6% was obtained and reaction was stopped chemically with 432 mg of a solution of hydroxyethyl carbamate [HOCH2CH2OC(=O)NH2], 10% strength in methyl glycol. Distillation took place at 150° C./1 mbar, to give an inventive product, in a yield of approximately 33%, having an NCO content of 24.1%, 3180 mPa*s.

Example PI2

800 g of pentamethylene diisocyanate corresponding to the above synthesis (color number 3 Hz; NCO content 54.4%) were reacted with 232 ppm of DABCO TMR, 7.5% strength in 2-ethylhexanol (2477 mg of catalyst solution), in a three-neck flask with stirrer at 75-84° C. After 50 minutes, an NCO content of 45.5% was obtained and reaction was stopped chemically with 1.63 g of a solution of hydroxyethyl carbamate, 10% strength in methyl glycol. Distillation took place at 153° C./1 mbar, to give an inventive product, in a yield of approximately 33%, having an NCO content of 24.4%, 2480 mPa*s, and 0% residual HDI content.

Example PI3

429 g of doubly freshly distilled pentamethylene diisocyanate in accordance with the above synthesis (color number 2 Hz) were reacted with a total of 171 ppm of N-benzyl-N,N,N-trimethylammonium 2-hydroxyisobutyrate catalyst, 5% strength in 2-ethylhexanol, in a three-necked flask with stirrer at 110° C. Initially 684 mg, after 10 minutes a further 271 mg, and after 20 minutes a further 516 mg of catalyst solution were added. With the final addition, the solution heated up to 170° C. and the product was stopped thermally at this temperature. In addition, the product was stabilized with 572 mg of a 5% strength solution of diethylhexyl phosphate in 2-ethylhexanol, (30 mol % based on the catalyst). The product was isolated in a yield of 37% from the monomer at 170° C. and 2 mbar. The resulting product had an NCO content of 22.7%, and 5200 mPa*s.

Performance Trials

Trial Series 1

Comparison of the coating compositions and performance results of inventive polyisocyanurate PI3 based on PDI with the noninventive polyisocyanurate HI1 based on HDI in combination with the polyacrylate polyol Joncryl 507 under basic catalysis with 1,4-diazabicyclo[2.2.2]octane (TEDA. 1.3% and 1.4%/polyol solid). Similarly, comparison with PI3 and HI1 with organometallic catalysis using DBTL (100 ppm/polyol solid) and Borchi® Kat 22 (1000 ppm/polyol solid).

| Quantity [g]/test | NvF | L1 | V-L1 | V-L2 | V-L3 | V-L4 | V-L5 | V-L6 |
|---|---|---|---|---|---|---|---|---|
| Joncryl ® 507 | 80% | 60.0 | 60.0 | 60.0 | 60.0 | 60.0 | 60.0 | 60.0 |
| PI3 | 100% | 22.2 | | | 22.16 | | 22.16 | |
| Basonat HI 100 | 100% | | 22.9 | 22.9 | | 22.87 | | 22.9 |
| 1,4-Diazabicyclo[2.2.2]-octane in butyl acetate | 10% | 6.24 | 6.24 | 6.72 | | | | |

-continued

| Quantity [g]/test | | NvF | L1 | V-L1 | V-L2 | V-L3 | V-L4 | V-L5 | V-L6 |
|---|---|---|---|---|---|---|---|---|---|
| DBTL | | 1% | | | | 0.48 | 0.48 | | |
| Borchi ® Kat 22, 10% in butyl acetate | | 10% | | | | | | 0.48 | 0.48 |
| Butyl acetate | | 0% | 27.5 | 27.5 | 27.0 | 32.5 | 32.0 | 32.5 | 31.8 |
| Flow time | s | | 20.1 | 20.1 | | 19.9 | 19.8 | 20.2 | 19.8 |
| Nonvolatile fraction | % | | 61.1 | 61.3 | | 60.9 | 61.4 | 61.6 | 61.6 |
| Gel time | h (dec) | | 2:31 | 3.15 | 2.37 | 6.22 | 5.05 | 16.3 | 15.0 |
| Dust dry | min | | 66 | 143 | 120 | >480 | >480 | >300 | >300 |
| Sand dry | h | | 1.8 | 3.5 | 2.5 | 19.5 | 17.8 | 16.5 | 13.3 |
| Through dry | h | | 2.25 | 1.75 | 2.5 | >24 | >24 | >20 | 5 |
| Pendulum hardness 5 h RT | swings | | 26 | 14 | 17 | — | — | — | — |
| Pendulum hardness 1 d RT | swings | | 48 | 51 | 42 | 3 | 3 | 12 | 15 |
| Pendulum hardness 2 d RT | swings | | 51 | 53 | | 33 | 25 | 40 | 39 |
| Pendulum hardness 60° C. | swings | | 97 | 84 | 80 | 12 | 11 | 21 | 23 |
| Erichsen 60° C. | mm | | 9.3 | 10 | 9.4 | 9 | 9 | 10 | 10 |
| Cross-cut 60° C. | rating | | 3.5 | 3 | 5 | 0 | 0 | 1 | 1 |
| Gloss 60° C. | GU 20° | | 89 | 88 | 94 | 92 | 92 | 88 | 87 |
| 1% H$_2$SO4, 60° C. | ° C. | | 38 | 36 | | 40 | 41 | 30 | 32 |
| 1% NaOH, 60° C. | ° C. | | 46 | 41 | | 50 | 50 | 43 | 33 |
| Pancreatin, 60° C. | ° C. | | 37 | 39 | | 42 | 44 | 36 | 42 |
| Tree resin, 60° C. | ° C. | | 30 | 30 | | 30 | 30 | 30 | 30 |
| Pendulum hardness 80° C. | swings | | 82 | 82 | 76 | 55 | 39 | 44 | 47 |
| Erichsen 80° C. | mm | | 9.3 | 9.7 | 9.8 | 9 | 9 | 10 | 10 |
| Cross-cut 80° C. | rating | | 3.5 | 3 | 5 | 0 | 0 | 2 | 2 |
| Gloss 80° C. | GU 20° | | 94 | 95 | 95 | 92 | 93 | 95 | 93 |
| 1% H$_2$SO4, 80° C. | ° C. | | 36 | 32 | | 42 | 44 | 35 | 37 |
| 1% NaOH, 80° C. | ° C. | | 30 | 30 | | 51 | 58 | 37 | 32 |
| Pancreatin, 80° C. | ° C. | | 39 | 36 | | 40 | 56 | 32 | 36 |
| Tree resin, 80° C. | ° C. | | 30 | 30 | | 30 | 30 | 30 | 30 |

The trial data show that inventive coating L1 based on PI3, relative to comparative coatings V-L1 (same amount of catalyst as PI3) and V-L2 (same gel time as PI3), exhibits better drying behavior and higher chemical resistance (data only for V-L1).

The comparative coatings V-L3/V-L4 with DBTL and V-L5/V-L6 with zinc octanoate as organometallic catalyst, at low temperatures in this formulation with the amounts of catalyst, exhibit significantly longer drying times/poorer pendulum hardnesses.

The curing of DBTL and zinc octanoate catalysis is better for HI1 than for PI3. An improvement in the drying/pendulum hardnesses at low temperatures through the use of the inventive isocyanurate of pentamethylene diisocyanate rather than the HDI isocyanurate occurs only in the case of basic TEDA catalysis.

The invention claimed is:

1. A method of coating a substrate, comprising
applying to the substrate a coating composition comprising:
a) at least one polyisocyanate obtained from pentamethylene diisocyanate as a precursor;
b) at least one hydroxy-functional poly(meth)acrylate polyol;
c) at least one Lewis base as urethanization catalyst; and
d) at least one organic solvent; and
curing the coating composition at a temperature of 80° C. or less.

2. The method according to claim 1, wherein the polyisocyanate a) is selected from the group consisting of isocyanurates, urethanes, and allophanates.

3. The method according to claim 1, wherein the polyisocyanate a) is a polyisocyanate comprising isocyanurate groups.

4. The method according to claim 1, wherein the polyisocyanate a) has a viscosity of 300-1200 mPa*s (23° C.).

5. The method according to claim 1, wherein the poly (meth)acrylate polyol b) has a molecular weight $M_n$ (number average) of 500 to 50 000.

6. The method according to claim 1, wherein the coating composition further comprises at least one polyester polyol which has a number-average molecular weight Mn of 500 to 4000 and/or a polydispersity of less than or equal to 5.

7. The method according to claim 6, wherein the poly (meth)acrylate polyol b) component to the polyester polyol component is in a weight ratio of from 2.7:1 to 20:1, based on the total solids content in the composition.

8. The method according to claim 1, wherein the Lewis base c) has a pKa of more than 8.

9. The method according to claim 1, wherein the Lewis base c) is selected from the group consisting of tertiary aliphatic, cycloaliphatic, aromatic amines, amidines, guanidines and ionic liquids comprising amine groups.

10. The method according to claim 1, wherein the Lewis base c) is a cycloaliphatic amine.

11. The method according to claim 1, wherein the curing is performed at a temperature in a temperature range from ambient temperature up to 80° C.

12. The method according to claim 1, wherein the substrate is a building, a vehicle, a wind turbine, a bridge, a power mast, a tank, a container, a pipeline, a power station, a chemical plant, a pool, a roof, furniture, a window, a door, wood flooring, or cardboard.

13. The method according to claim 1, wherein the substrate is wood, wood veneer, paper, paperboard, cardboard, textile, film, leather, nonwoven fabric, glass, ceramic, mineral building materials, plastics, or metals, each of which may optionally have been already coated and/or pretreated.

14. The method according to claim 1, wherein the coating composition further comprises at least one of a coating additive, a filler, a dye, and/or a pigment.

15. The method according to claim 1, wherein the polyisocyanate a) is selected from the group consisting of isocyanurates, urethanes, and allophanates, the polyisocyanate a) having a viscosity of 300-1200 mPa*s (23° C.), wherein the poly(meth)acrylate polyol b) has a molecular weight $M_n$ (number average) of 500 to 50 000, and wherein the Lewis base c) is a cycloaliphatic amine.

* * * * *

UNITED STATES PATENT AND TRADEMARK OFFICE
CERTIFICATE OF CORRECTION

PATENT NO. : 10,358,576 B2
APPLICATION NO. : 15/567827
DATED : July 23, 2019
INVENTOR(S) : Harald Schaefer et al.

It is certified that error appears in the above-identified patent and that said Letters Patent is hereby corrected as shown below:

On the Title Page

Item (73), "Ludwigschafen" should read --Ludwigshafen--.

In the Specification

Column 10, Line 42, "hexy" should read --hexyl--.

Column 11, Line 36, "MN" should read --$M_n$--.

Column 12, Line 1, "dimethyl propyl," should read --dimethylpropyl,--.

Column 16, Line 20, "benzo-triazol" should read --benzotriazol--;

Column 16, Line 24, "dimethyl-ethyl" should read --dimethylethyl--.

In the Claims

Column 24, Line 41, Claim 6 "Mn" should read --$M_n$--.

Signed and Sealed this
Seventeenth Day of March, 2020

Andrei Iancu
*Director of the United States Patent and Trademark Office*